3,708,460
PROCESS FOR THE MANUFACTURE OF
POLY-β-AMIDES
Walter Rupp, Niederhofheim, Taunus, and Claus Beermann, Neu Isenburg, Germany, assignors to Farbwerke Hoechst Aktiengesellschaft vormals Meister Lucius & Bruning, Frankfurt am Main, Germany
No Drawing. Filed July 15, 1970, Ser. No. 55,219
Claims priority, application Germany, July 24, 1969,
P 19 37 663.7
Int. Cl. C08g 20/10
U.S. Cl. 260—78 L        4 Claims

ABSTRACT OF THE DISCLOSURE

To obtain β-lactams of high molecular weight by anionic polymerization the catalyst solution or suspension and simultaneously a solution of the β-lactam or mixture of β-lactams are metered into the polymerization vessel containing a solvent at a temperature of from 10 to 100° C.

---

The present invention relates to a process for the manufacture of poly-β-amides.

U.S. Pat. 3,462,397 describes a process for the manufacture of high molecular weight poly-β-amides from definite β-lactams by anionic polymerization in the presence of catalysts and cocatalysts in a two-phase system.

The mechanism of the anionic β-lactam polymerization is known (cf. Angew. Chem. volume 80, page 308, 1968). The mean molecular weight which can be obtained in this manner depends on the chain start. In general, N-acyl-lactams are added as chain starting agents which initiate the start by a rapid reaction with the lactamate anions. When β-lactams are polymerized at medium or low polymerization speeds at low temperatures, for example in the case of dialkyl-substituted β-lactams below +10° C., and care is taken that no chain interrupting agents are present, such as water, amines and alcohols, the mean molecular weights that can be obtained are inversely proportional to the added amounts of acyl-lactam.

With β-lactams having a higher polymerization speed, for example 4-monoalkyl-substituted β-lactams, and preferably at higher temperatures, for example 30 or 50° C., the "controlled" chain start takes place simultaneously with a so-called "wild" chain start caused by a slow reaction between a lactam anion and a latcam molecule to an aminoacyl-lactam, which, for its part, as acyl-lactam acts as rapid chain starting agent.

Hence, it follows that with rapidly polymerizing β-lactams, especially at elevated temperatures, the obtainable molecular weight is not inversely proportional to the amount of chain starting agent added but considerably lower. If no N-acyl-lactam is used as chain starting agent as repeatedly proposed, i.e. only the catalyst is added to a solution or emulsion of the lactam, there is no possibility to increase the molecular weight. It can only be reduced by adding chain cleaving agents.

It has now been found that in the anionic polymerization of β-lactams the molecular weight can be regulated without using a cocatalyst by maintaining during the course of polymerization a definite ratio of the molar concentration of the β-lactam to the molar concentration of the catalyst. If a high molecular weight is desired, a high ratio of β-lactam to catalyst is used in the starting phase of the polymerization to produce the desired amount of chain starting agent, whereas a very small ratio of β-lactam to catalyst is used in the growing phase of the polymerization in order to suppress new chain starts. This can be done by introducing both components in dosed quantities into the reaction vessel.

The present invention thus provides a process for the manufacture of polyamides of high molecular weight by anionic polymerization of at least one β-lactam, if desired in the pure or enriched, optically active form, of the group consisting of azetidinone-2, 4-methyl-azetidinone-2, 4-ethyl-azetidinone-2, 4-vinyl-azetidinone-2, cis- and trans-3, 4-dimethylazetidinone-2, in the presence of a catalyst in a mixture consisting of a solvent for the said lactam or lactams and a diluent for the said solution, which comprises metering into the reaction vessel, which may contain a mixture of solvent and diluent, during the course of from 1 to 300 minutes at a temperature of from 10 to 100° C., the catalyst, optionally in the form of a solution or suspension, and simultaneously the β-lactam or lactams to be polymerized, optionally dissolved in an aromatic or halogenated aromatic hydrocarbon or hydrocarbon mixture and diluted with an aliphatic hydrocarbon or hydrocarbon mixture, the proportion by weight of β-lactam or β-lactams to solvent being in the range of from 1:10 to 1:0.2 and the proportion by volume of solvent to diluent being in the range of from 1:20 to 1:0.5.

The monomeric lactams that can be polymerized by the process according to the invention have the general formula

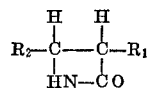

in which in the case of the unsubstituted azetidinone-2 $R_1$ and $R_2$ stand for hydrogen, in the case of 4-methyl-azetidinone-2 $R_1$ stands for hydrogen and $R_2$ stands for methyl, in the case of 4-ethyl-azetidnone $R_1$ stands for hydrogen and $R_2$ stands for ethyl, and in the case of cis- and trans-3, 4-dimethyl-azetidinone-2 $R_1$ and $R_2$ stand for methyl. The aforesaid β-lactams can also be used in their pure of enriched optically active forms. The optically active β-lactams can be obtained, for example, as described in Belgian Pat. No. 741,422.

The β-lactams can be polymerized either individually or in admixture with one another.

The polymerization catalyst, in general an alkali metal lactamate, for example potassium-pyrrolidone, is preferably prepared in the same aromatic solvent and dissolved or suspended therein, as used for dissolving the β-lactam. The potassium-pyrrolidone, for example, prepared from pyrrolidone and potassium hydroxide, for example in o-dichlorobenzene, xylene or toluene, by azeotropic removal of water, constitutes a fine suspension which can be readily dosed even with a high solids content. Although the catalyst may be metered in in powder form, it is preferable to use it in the form of a solution or suspension.

As solvents for the β-lactams there are used halogenated aromatic compounds such as chlorobenzene, bromobenzene, o-dichlorobenzene, 2, 3-, and 4-chlorotoluene. It is likewise possible to use benzene and alkylated benzenes, for example toluene, xylene, or ethylbenzene, either alone or in admixture with the aforesaid halogenated aromatic compounds as solvents for the β-lactams. In the process of U.S. Pat. 3,462,397 benzene and the alkylated aromatic hydrocarbons are unsuitable as solvents because their use would yield polymers the molecular weights of which are too low. As the process of the present invention yields poly-β-lactams having higher molecular weights than the polymers obtained by the above U.S. patent, it is possible to use benzene and alkylated aromatic hydrocarbons as solvent.

Suitable diluents are aliphatic hydrocarbons or mixtures thereof, for example gasoline fractions free from aromatic compounds and boiling in the range of from 100 to 240° C., preferably 150 to 200° C., heptane and hexane. The use of low boiling solvents and diluents offers advantages in the working up of the reaction products in that the time required for the steam distillation and the drying periods is shortened.

The solvent and diluent can be mixed with one another in any ratio, while the β-lactams are completely soluble in the solvent but miscible with the diluent to a limited extent only.

When the reaction vessel contains a sufficient amount of solvent and diluent, the β-lactam or β-lactam mixture can be metered in as such. Otherwise, the lactam or lactam mixture should be metered into the reaction vessel together with the solvent and diluent.

Dosing should be performed over a period of from a few minutes to several hours, i.e. approximately 1 minute to 300 minutes, preferably 90 to 180 minutes, depending on whether the poly-β-lactam shall have a higher molecular weight than a corresponding polymer obtained by first introducing the lactam and solvent or mixture of solvent and diluent into the polymerization vessel and than adding the catalyst.

The polymerization according to the invention is carried out at a somewhat higher temperature than that described in U.S. Pat. 3,462,397 to favor the "wild" chain start, the temperature being in the range of from about 10 to 100° C., preferably 35 to 50° C.

In the mxture of β-lactam/solvent/diluent as well as in the reaction mixture the proportion by weight of β-lactam or mixture of β-lactams to solvent should be in the range of from 1:10 to 1:0.2, advantageously 1:3 to 1:0.5. The proportion by volume of solvent to diluent should be in the range of from about 1:20 to 1:0.5, advantageously 1:5.3 to 1:2.3.

During metering in the β-lactam or mixture of β-lactams and the catalyst the catalyst concentration generally increases constantly. It corresponds to the sum of catalyst amounts added because charged chain ends as well as new catalyst are always protonized by the fresh lactam, whereas the lactam concentration permanently decreases after a short rise as with an increasing catalyst concentration the lactam is more and more rapidly transformed into the lactam anion and added on the chain end.

By prolonging or shortening the dosing period, the proportions of concentrations may be shifted with respect to one another whereby the molecular weight can be increased or reduced.

When little polar solvents or diluents are used in which the polymer precipitates early, the simultaneous metering in of the catalyst increases the rate of conversion.

While the process of the aforesaid U.S. patent is carried out in a two-phase system, in the present process the lactam is polymerized in almost every case in a genuine solution, because with low lactam concentrations a two-phase system cannot be obtained.

To carry out the process of the invention it is possible first to introduce into the polymerization vessel the main quantity of the mixture of solvent and diluent and then to add in dosed quantities the lactam and the suspended or dissolved catalyst in the desired ratio. When proceeding in this manner, the dilution is very high at the beginning. It is, therefore, more favorable to meter in not only the catalyst and the lactam but also the mixture of solvent and diluent or at least part thereof, the mixture of solvent and diluent being preferably added together with the lactam. In the latter case a lactam solution or a lactam emulsion is metered in, depending on the chosen temperature and concentration. This mode of operation has proved especially advantageous. The process of the invention does not only permit higher molecular weights to be obtained with a definite system, it makes it also possible to obtain considerably higher amounts of polymer per unit of volume without the polymer dispersion becoming considerably thicker, i.e. higher apparent densities are obtained.

In the normal case the three components β-lactam, catalyst suspension and mixture of aromatic and aliphatic compounds are introduced into the reaction vessel in dosed quantities simultaneously and uniformly, i.e. in equal quantities per unit of time and in the proportion of their total concentrations. In this manner good results are obtained. It is likewise possible, as already mentioned above, to influence the polymerization by adding the components in different manner, for example by choosing a high lactam concentration above the average at the beginning for the starting reaction and then maintaining it especially low during the reaction of growth, or by first introducing part of the catalyst into the polymerization vessel before the beginning of the reaction. The polymerization can be further influenced by the temperature, for example by maintaining a higher temperature during the starting period than during the period of growth, whereby the molecular weight can be varied.

The following examples illustrate the invention. The relative viscosities were measured with solutions of 1 gram of the respective polymer in 100 milliliters of concentrated sulfuric acid at 20° C.

EXAMPLE 1

15.5 liters of heavy gasoline boiling at 145–165° C. and 4.5 liters of o-dichlorobenzene were introduced into a 150 liter polymerization vessel provided with stirrer, heating and cooling means and heated to 40° C. A 100 liter vessel with stirrer, which was connected with the polymerization vessel by means of a dosing pump, was charged with 54.5 liters of heavy gasoline, 15.5 liters of o-dichlorobenzene and 13 kilograms of 4-methyl-azetidinone-2. The emulsion obtained was kept in motion by stirring. In a 10 liter vessel with stirrer, which was likewise connected with the polymerization vessel by means of a dosing pump, 325 grams of potassium-pyrrolidone were suspended in 9 liters of o-dichlorobenzene. The lactam emulsion and the catalyst suspension were uniformly pumped within 90 minutes into the polymerization vessel in a corresponding proportion. Just after the beginning of dosing the heating was switched off and the reaction mixture was cooled instead so that the temperature did not exceed 45° C. When the addition was terminated, the polymerization mixture was stirred for another 2 hours, the polymer was filtered off with the suction, adhering solvent and diluent were removed with steam, the polymer was washed with water and dried. 12.7 kilograms of poly-4-methyl-azetidinone having a relative viscosity of 4.5 were obtained.

EXAMPLE 2

Polymerization was carried out as described in Example 1, with the exception that dosing was prolonged to 120 minutes. Approximately the same yield of polymer was obtained, the polymer having a relative viscosity of 4.9.

EXAMPLE 3

Polymerization was carried out as described in Example 1, with the exception that the dosing period was prolonged to 150 minutes. The same yield of polymer was obtained, the polymer having a relative viscosity of 5.6.

EXAMPLE 4

To demonstrate that the increase in the molecular weight as shown in Examples 1 to 3 only depends on the dosing period and hence varying proportions of the concentration of β-lactam and catalyst, the polymerization was carried out with the same dosing period, the same volumes of solvent and diluent and at the same temperature, while the amounts of β-lactam and catalyst were correspondingly increased. The reaction was carried out in the apparatus described in Example 1 with the amounts of solvent and diluent indicated in said example, a dosing period of 150 minutes and at a polymerization temperature of +40° C., the amounts of lactam and catalyst being increased in the same proportion as follows:

| 4-methyl-azetidinone-2, kilograms | Potassium-pyrrolidone, grams | Relative viscosity |
|---|---|---|
| 14 | 350 | 5.7 |
| 15 | 375 | 5.6 |
| 16 | 400 | 5.8 |
| 17 | 425 | 5.6 |
| 18 | 450 | 4.65 |
| 19 | 475 | 5.6 |
| 20 | 500 | 5.7 |

EXAMPLE 5

Polymerization was carried out as described in Example 4 using 18 kilograms of monomer, with the exception that the dosing period was prolonged to 180 minutes. 17.5 kilograms of poly-4-methyl-azetidinone-2 having a relative viscosity of 6.5 were obtained.

EXAMPLE 6

Polymerization was carried out as described in Example 1, with the exception that instead of 13 kilograms of β-lactam 10 kilograms were used and correspondingly 250 grams of potassium-pyrrolidone. The lactam emulsion was uniformly metered into the polymerization vessel (about 890 milliliters per minute) while the dosage of the catalyst suspension was varied as follows: in the first 30 minutes 50 milliliters were introduced per minute, during the second 30 minutes 100 milliliters were introduced per minute and in the last 30 minutes 150 milliliters were introduced per minute. 9.4 kilograms of poly-4-methyl-azetidinone having a relative viscosity of 7.1 were obtained.

EXAMPLE 7

2,560 milliliters of heavy gasoline boiling at a temperature in the range of from 145 to 165° C. and 540 milliliters of o-dichlorobenzene were introduced into a polymerization vessel and heated to 40° C.

A dropping funnel was charged with 800 milliliters of 4-methyl-azetidinone, a second dropping funnel with stirrer contained 100 milliliters of a suspension of 20 grams of potassium-pyrrolidone in o-dichlorobenzene. Both components were added in a proportion by volume of 8:1 over a period of 150 minutes, the internal temperature being maintained at 40° C. When dosing was terminated, the polymerization mixture was stirred for 2 hours at 40° C., the polymer was filtered off with suction, subjected to a steam treatment and dried at 100° C. 785 grams of poly-4-methyl-azetidinone having a relative viscosity of 5.2 were obtained.

EXAMPLE 8

In a polymerization vessel 280 milliliters of gasoline boiling at 116–140° C. and 120 milliliters of xylene isomer mixture were heated at 50° C. In a vessel with stirrer an emulsion was prepared of 2,100 milliliters of the above gasoline, 900 milliliters of xylene and 400 milliliters of 4-methylazetidinone, in a dropping funnel with stirrer a suspension was prepared from 10.2 grams of potassium-pyrrolidone, 140 milliliters of the gasoline and 60 milliliters of xylene. By means of suitable dosing means the two components were metered into the polymerization vessel over a period of 120 minutes (28.3 milliliters of emulsion and 1.66 milliliters of catalyst suspension per minute). The temperature was maintained at 50° C. After a further 90 minutes the polymer was filtered off with suction, distilled with steam and dried. 376 grams of poly-4-methylazetidinone having a relative viscosity of 4.6 were obtained.

EXAMPLE 9

The polymerization was carried out as described in the preceding example with the exception that the xylene was replaced by toluene. 373 grams of poly-4-methyl-azetidinone having a relative viscosity of 4.5 were obtained.

EXAMPLE 10

The polymerization was carried out as described in Example 8, but the gasoline boiling at 116–140° C. was replaced by n-hexane and benzene was used instead of xylene. The polymerization temperature was reduced to 35° C. 380 grams of poly-4-methyl-azetidinone having a relative viscosity of 4.9 were obtained.

EXAMPLE 11

Example 6 of U.S. Pat. 3,462,397 was practised as follows: 70 grams of 4-methyl-azetidinone-2, 21 grams of trans-3, 4-dimethyl-azetidinone-2, 9 grams of cis-3,4-dimethyl azetidinone-2, 22.5 milligrams of oxalyl-pyrrolidone, 200 milliliters of o-dichlorobenzene and 700 milliliters of heavy gasoline having a boiling range of 180 to 205° C. were cooled to 14° C. while stirring. A solution of 2 grams of potassium-pyrrolidone, 3 milliliters of 4,4-dimethyl-azetidinone-2 and 100 milliliters of o-dichlorobenzene was added over a period of 4 minutes. By thorough cooling care was taken that the temperature in the reaction vessel did not exceed 25° C. After a time of reaction of about 4 hours the dispersion was filtered off with suction, the product was treated with steam and dried. 91 grams of a fine-grained statistic copolymer were obtained having a relative viscosity of 3.7.

In conformity with the present invention this mode of operation was modified as follows:

The polymerization vessel was first charged with 70 milliliters of heavy gasoline having a boiling range of from 180 to 205° C. and 20 ml. of o-dichlorobenzene. In a dropping funnel an emulsion was prepared from 630 milliliters of heavy gasoline, 180 milliliters of o-dichlorobenzene, 70 grams of 4-methyl-azetidinone-2, 21 grams of trans-3,4-dimethyl-azetidinone-2 and 9 grams of cis-3,4-dimethyl-azetidinone-2, the emulsion was kept in motion by stirring or slightly heated at 30–35° C. to transform it into a genuine solution. A second dropping funnel provided with stirrer was charged with a catalyst suspension of 2 grams of potassium-pyrrolidone in 100 milliliters of o-dichlorobenzene. The two components, i.e. the lactam emulsion or solution and the catalyst suspension were simultaneously metered into the polymerization vessel over a period of 90 minutes in the corresponding proportion. The temperature of the reaction mixture was maintained at 35° C. The reaction mixture was stirred for 2½ hours, the copolymer was filtered off with suction, subjected to a steam distillation and dried. 93 grams of copolymer having a relative viscosity of 4.9 were obtained.

EXAMPLE 12

Example 7 of U.S. Pat. 3,462,397 was practised as follows: 50 grams of 4-vinyl-azetidinone-2, 11-milligrams of oxalyl-pyrrolidone, 100 milliliters of chlorobenzene and 200 milliliters of heavy gasoline boiling in the range of from 180 to 205° C. were cooled to 15° C. while stirring. A solution of 0.8 gram of potassium-pyrrolidone, 1.5 milliliters of 4,4-dimethyl-azetidinone-2 and 50 milliliters of chlorobenzene was added and by thorough cooling care was taken that the temperature in the reaction vessel did not exceed 25° C. The dispersion obtained had very good properties, the yield was quantitative. The poly-β-amide which still contained all vinyl groups in a non-modified state had a relative viscosity of 6.9.

In conformity with the present invention this mode of operation was modified as follows:

60 milliliters of heavy gasoline and 30 milliliters of chlorobenzene were first introduced into the polymerization vessel and heated to 40° C. A dropping funnel was charged with a solution heated at 35° C. of 130 milliliters of heavy gasoline, 80 milliliters of chlorobenzene and 50 grams of 4-vinyl-azetidinone-2. A second dropping funnel provided with stirrer was charged with a catalyst suspension consisting of 1 gram of potassium-pyrrolidone, 40 milliliters of chlorobenzene and 10 milliliters of heavy gasoline. Lactam solution and catalyst suspension were simultaneously metered into the polymerization vessel over a period of 90 minutes and in the corresponding proportion by volume, while the temperature was maintained at 40° C. After a further hour the polymer dispersion was filtered off with suction, the polymer was purified by steam distillation and dried. The yield obtained was quantitative, the polymer had a viscosity of 7.8.

What is claimed is:

1. A process for the manufacture of polyamides of high molecular weight consisting of anionically polymerizing at least one β-lactam of the group consisting of azetidinone-2, 4-methyl-azetidinone-2, 4-ethyl-azetidinone-2, 4-vinyl-azetidinone-2, cis- and trans-3,4-dimethyl-azetidinone-2 in the presence of an alkali metal lactamate as a catalyst, said polymerizing being carried out in a mixture of an aromatic or halogenated aromatic hydrocarbon or hydrocarbon mixture as solvent for said β-lactam and an aliphatic hydrocarbon or hydrocarbon mixture as diluent for said β-lactam solution, the proportion by weight of β-lactam or mixture of β-lactams to solvent or solvent mixture being in the range of from 1:10 to 1:0.2 and the proportion by volume of solvent to diluent being in the range from 1:20 to 1:0.5, said process consisting essentially of metering the catalyst, optionally in the form of a solution or suspension, and simultaneously metering the β-lactam or lactam mixture to be polymerized, optionally dissolved in the said solvent or solvent mixture and diluted with said diluent or diluent mixture, over a period of from 1 to 300 minutes at a temperature in the range of from 10 to 100° C. into the polymerization vessel, optionally containing a mixture of said solvent and said diluent for the β-lactam or mixture of β-lactam, and polymerizing said β-lactams or lactam mixture in absence of co-catalysts and emulsifiers.

2. The process as claimed in claim 1, wherein the β-lactam is used in the pure or enriched, optically active form.

3. The process as claimed in claim 1, wherein the metering period is in the range of from 90 to 180 minutes.

4. The process as claimed in claim 1, wherein the temperature is in the range of from 35 to 50° C.

References Cited

UNITED STATES PATENTS 3,538,059  11/1970  Beermann et al. _____ 260—78 L
3,583,947  6/1971  Schmidt et al. _____ 260—78 L WILLIAM H. SHORT, Primary Examiner L. M. PHYNES, Assistant Examiner U.S. Cl. X.R.
260—33.6 R, 33.8 R